Patented Oct. 4, 1932

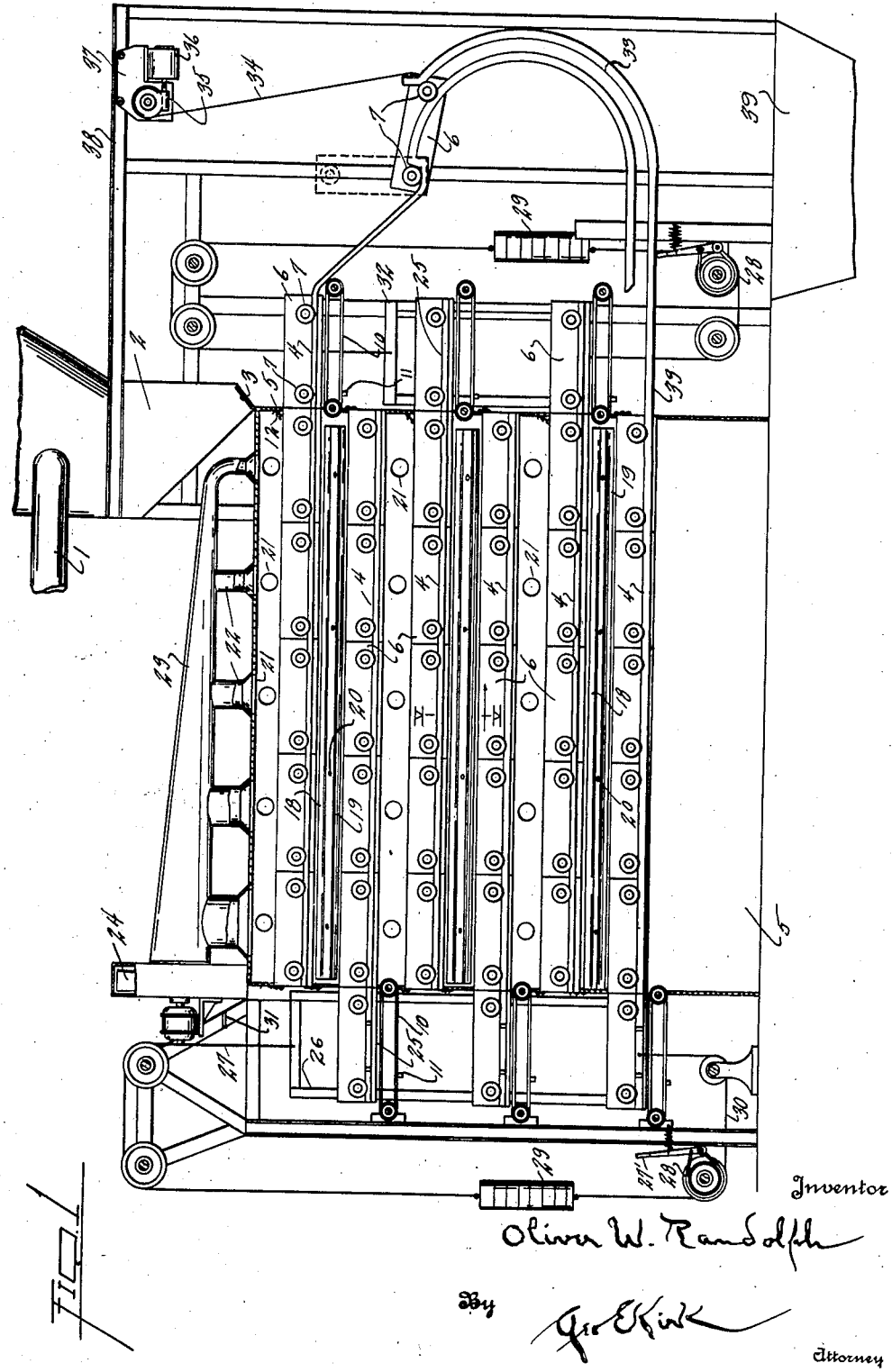

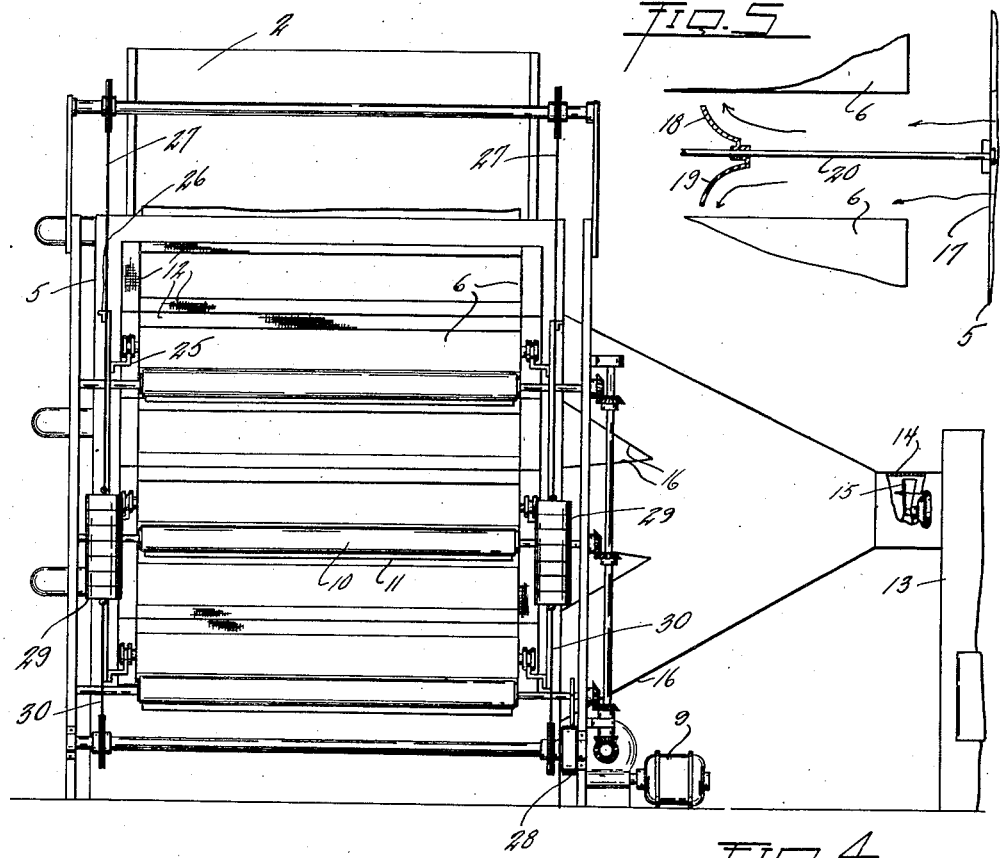
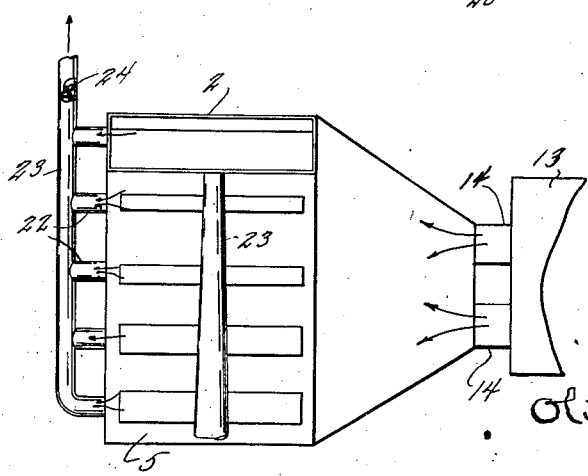
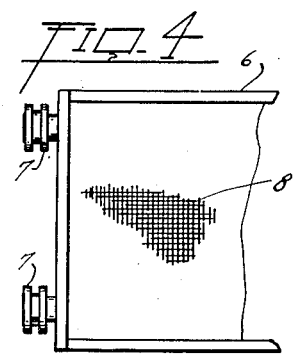

1,881,063

UNITED STATES PATENT OFFICE

OLIVER W. RANDOLPH, OF TOLEDO, OHIO

MULTIPLE TRAY DRIER

Application filed February 18, 1929. Serial No. 341,001.

This invention relates to the treatment of layers of loose material.

This invention has utility in air, heat and drying treatment of chopped coarse materials, as vegetables or hay as well as cereals or other more or less fine substances.

Referring to the drawings:

Fig. 1 is a side elevation, with parts broken away, of an embodiment of the invention in a drier installation;

Fig. 2 is an end elevation of the device of Fig. 1, parts being broken away;

Fig. 3 is a fragmentary plan view on a smaller scale;

Fig. 4 is a portion in plan of a tray; and

Fig. 5 is a partial section through the apparatus on the line V—V, Fig. 1.

By blower or other elevator means, material may be delivered from spout 1 to hopper 2 having manually controlled gate 3. Track 4 as extending from housing 5 has thereon tray 6 provided with rollers 7 coacting with the track 4. This tray 6 has mesh or foraminous bottom 8 so that draft may be upward into the layer of material as carried by this tray 6. As the tray is charged in this position at charging station in the vicinity of the hopper 2, motor 9 may be cut in for operating endless belt feed devices 10 having flights 11. These feed devices are effective for urging the tray 6 through flexible boundary material as at draft impeding valve opening 12 entrance into the housing 5.

Furnace 13 is shown as having take-off 14 with power driven fan 15 therein, thus serving to supply hot gases through ducts 16 for delivery by openings 17 between alternate tracks 4 in the housing 5 and below the upper track 4. In these regions as well as between the intake port regions there may be adjustment for desired draft distribution, by baffles 18, 19, on rods 20. These concave baffles 18, 19, on the rods 20 (Fig. 5), are in the chamber of the housing and extend between the valve devices and over the trays (Fig. 1). The baffle 18 may be located independently of a baffle 19, by sliding one or the other along the rods 20 to the desired position toward or away from the intake opening 17.

The draft as thus adjusted for distribution and control in the housing 5 may pass upward through the trays thereover and downward through the trays below such intake region for passing from the housing 5 by exhaust openings 21 in communication with ducts 22 extending to manifolds 23 wherein there may be fans 24 as induced draft means for increasing the draw off rate as may be found desirable in removing these moisture laden fumes. It is to be noted that the outlets 22 for the fumes from the housing (Fig. 1) are of less capacity adjacent the material supply hopper 2 and increase in size along the manifold 23 toward the fan 24.

As the tray 6 is introduced into the housing 5 at the charging station adjacent the hopper 2, the terminal tray on the track 4 remote therefrom is thrust outward from the housing to rest on track section 25 in alignment with the track 4. This procedure occurs as to the alternate rows of trays in this descending back and forth column so that frame 26 as suspended by cable 27 is thus loaded with the series of trays of material, delivered from valved openings 12 clear of the housing 5.

The operator may by handle lever 27' control brake band 28 for freeing the cable 27 as passing from the frame 26 to counterweight 29 and thence by cable 30 to the lower portion of the frame 26. As so released, the charged trays 6 with more or less dried material have mass considerable in excess of the counter-weight 29 and thus there is gravity descent of the track sections 25 to approximate registering with track sections 4 below the delivery receiving position. In this lowered position, motor 9 may be operated to cause endless belt feeding conveyors 10 having flights 11 thus to shift these several trays 6 from this frame 26 through the valve openings 12 into the housing 5 on the successive tracks under that which these trays have passed. The emptied, lowered devices now ascend. The limit of this ascent is against stop 31, at which point the devices are in position to register with tracks for receiving a succeeding set of trays for subsequent lowering. This introduction of these trays at one end results in delivery at the opposite end, for such to be received upon track section 25 in frame 32 similar to the frame 26. As the trays are shoved clear of the frame 26, the operator may release the brake 28 and thus allow the counter-weight 29 to retrieve the frame 26 so that there is location of the track sections 25 in position for receiving a successive tray 6 as discharged from the housing 5. This back and forth tray travel may be with desired intermissions according to the substance treated or the feeder conveyor 10 may be operated continuously from the motor 9 at a desired rate for alternately delivering trays at one end and then at the other.

As the trays complete the descent through the housing 5 at the region of track 33, cable 34 may be given a wrap about such delivery tray 6. Then through speed reduction 35, the operation of motor 36 is effective to dump the tray 6 as the rollers 7 travel on the track 33. The continued travel of this tray from the dump position is to righting position. As the hoisting cable 34 is mounted on car 37 carried by track 38, there may be travel of this car 37 in this righting operation of the trays 6 to deliver such trays to the charging station of the track 4 in the vicinity of the hopper 2. The dumped material passes by discharge hopper 39 from the delivery station and in the region of the track 33.

As the more moist trays are at the top and the natural direction for hot gases is more readily upward, the greater intensity of heat at the more moist region is thus in the natural position therefor, while as the material becomes drier in the lower stages and accordingly may be more combustible, the lower temperature gases as normally supplied below, thereby automatically reduce ignition hazards.

What is claimed and it is desired to secure by United States Letters Patent is:

1. Apparatus for subjecting material to contact with a gas, said apparatus comprising a housing forming a chamber provided with transverse ways, trays for the ways, draft control and directing means having communication into the housing about the trays and above alternate transverse ways, tray shifting transfer means exterior of and at opposite ends of the housing and away from the draft control and directing means, partitions between the housing and transfer means, and valve means in the partition at the respective ways independently of the draft control and directing means, said valve means coacting with the trays to confine a draft in the chamber away from the transfer means, said ways providing a back and forth descending course for the trays during the exposure to a gas of material on the trays and away from the tray shifting transfer means.

2. Apparatus for subjecting material to contact with a gas, said apparatus comprising a housing forming a chamber provided with transverse superposed ways, trays for the ways, tray lowering means outside the chamber at each end of the ways, draft control and directing means in the housing about the trays on the transverse ways and isolated from the lowering means, partitions between the housing and tray lowering means, valve means in the partition at the respective ways independently of the draft control and directing means, said valve means coacting with the trays to confine a draft in the chamber away from the lowering means, and tray actuating means for shifting trays through the device from the lowering means upon the ways, the material on said trays undergoing exposure to a gas during said shifting upon the ways and away from the tray lowering means.

3. Apparatus for subjecting material to contact with a gas, said apparatus comprising a housing forming a chamber provided with transverse superposed ways, trays for the ways, charging means for the trays into one end of a way to effect tray shifting along the way therefrom, tray lowering means in staggered sequence at each end of the ways outside the chamber, draft control and directing means in the housing about the trays on the transverse ways and isolated from the lowering means, partitions between the housing and tray lowering means, valve means in the partition at the respective ways independently of the draft control and directing means, said valve means coacting with the trays to confine a draft in the chamber away from the lowering means, control mechanism for lowering means operation, and retrieving means for the lowering means, the material on said trays undergoing exposure to a gas during said shifting upon the ways and away from the tray lowering means.

In witness whereof I affix my signature.

OLIVER W. RANDOLPH.